United States Patent Office 2,823,759
Patented Feb. 18, 1958

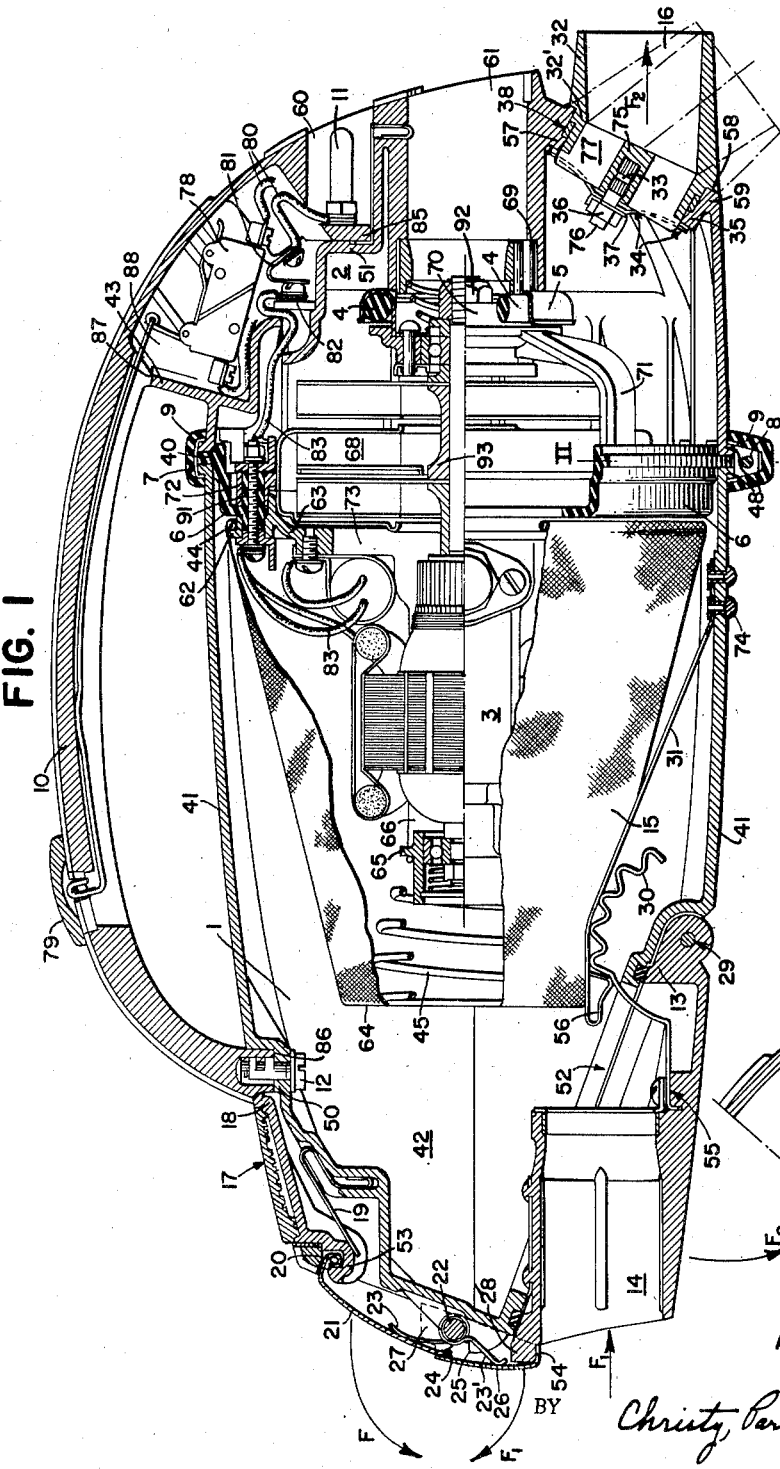
INVENTOR
ANDRÉ CONORD

2,823,759

SUCTION CLEANERS

André Conord, Paris, France, assignor to Societe Moderne d'Appareils Menagers Conord, Paris, France, a company of France Application March 23, 1955, Serial No. 496,256

Claims priority, application France December 2, 1954

8 Claims. (Cl. 183—37)

The invention relates to a dust suction device of the handle propelled type and is particularly concerned with means for rendering such a suction device more easy to assemble and more efficient than conventional cleaners of a similar type.

The invention has for its first object means for resiliently mounting within an outer casing a mechanical assembly including a motor-fan unit and an air filter bag.

It has for a second object a suction device possessing a fixed dust filter traversed by the dust-laden air from the outside towards the inside and causing the dust to be deposited in a dust chamber, also a mechanism for opening a door by which the dust accumulated in the chamber can be withdrawn.

It has for a third object an automatic shaker for shaking the filter when this door is opened.

It has for a fourth object means for positioning the delivery opening of the suction device about its axis.

Other objects of the invention will appear from the following description with reference to the accompanying drawings, in which:

Figure 1 is a longitudinal section through the whole of the suction device, some elements being shown in elevation, Figure 2 is a section, on II—II in Figure 1, of a detail of the attachment between the front and rear parts of the casing, and Fig. 3 is a section of a detail of the attachment of the rear portion of the handle to the rear part of the casing.

As will be seen, the envelope of the suction device consists of a casing in two parts 1, 2. The inlet or front part 1 is itself composed of a substantially tubular central region 41 and a forward region 42. The outlet or rear part 2 carries a partition 43 supporting various extensions which will be explained in detail hereinafter, a socket 60 for the current supply for the motor, a socket 61 for connection to an accessory device and an outlet opening 16 for the dust-free air. Disposed in the interior of these two parts 1, 2 is the mechanical assembly comprising the motor unit 3 with the air suction fans 68 and the air filter 15. This filter is secured by a ring 44 to a rim 62 of an annular support 63 and is held extended by a spring 45 bearing against the end 64 of the filter and against a collar 65 on a support 66 fixed to the motor unit 3. The casing parts 1 and 2 are each bounded by a rim 48 and the two rims are held together by a metal band 7 having a U-shaped cross section and strongly tightened by means of a screw 8 (Figure 2) engaging in lugs 49 on the band 7. The side flanges 67 of the U-section are slightly inclined so that the tightening of the screw 8 draws the rims 48 of the casing parts 1, 2 strongly towards each other. Arranged between the rims 48 is an annular rubber gasket 40 intended to make a good joint. The U-section band 7 is covered by a profiled rubber band 9 forming a shock absorber or fender for the suction device.

The motor 3 is intended to drive some auxiliary appliance through an output stud 92 of convenient polygonal section mounted on the motor shaft 93. It is consequently necessary to have the stud 92, and of course also the whole of the motor-fan unit, accurately centered with respect to the socket 61. This result is obtained by supporting the rear or output end of the motor-fan unit in the interior of the casing by a projecting annular part 70 fitted into an elastic toric ring 4 which rests in an annular U-section channel 5 secured to the inner periphery of the socket 61 of the casing by rivets 69. The ring 5 embraces with compression the annular part 70 which forms the outer end of the motor support 71. The motor unit is also supported at its largest part by an annulus 6 of elastic material, preferably rubber, which is itself secured in the casing. Preferably and as shown in the drawing, the annulus 6 is in one piece with the gasket 40, so that the clamping of this gasket between the rims 48 serves to secure the annulus 6 and, therefore, the motor unit. The annulus 6 supports the motor unit 3 by blocks 91 moulded with the said annulus and engaged in metal sleeves 72 which are in one piece with the support 63 integral with the motor housing 73. 11 are pins for the supply of current for the motor 78 a switch controlling the supply to the motor, 79 a sliding knob for manipulating this switch and 80 conductors terminating in spring leaves 81. These various elements are located on the handle 10 to which further reference will be made hereinafter.

The current reaches the motor by way of contact heads 82, co-acting with the spring leaves 80, and through wires 83.

The casing 1, 2 forms an externally cylindrical, completely closed, assembly enclosing the motor unit and the filter. The handle 10 is fitted to this assembly, on the one hand, by means of a screw 12 taking against a projection 50 on the front part 1 of the casing and, on the other hand, by screws which engage in a boss 85 of the handle and in a projection 51 on the rear part 2 of the casing. In the illustrated embodiment of the invention as disclosed in Fig. 3 of the drawing, these screws are constituted by threaded parts of the pins 11. The screw 12 is put in position and manipulated from the interior of the casing part 1 through a lower opening 52 closed by a door 13 to which further reference will be made. The handle 10 bears against the casing towards the inlet end of the casing by the surface 86 and towards the outlet end of the casing by the surface 87 which comes in contact with the extremity of the partition 43 of the casing. The partition 43 and the corresponding external portion of the handle 10 bound a recess 88 in which the switch 78 is accommodated.

It follows from what has so far been said that the suction device is composed of four distinct assemblies or units which can be rapidly assembled and disassembled: the mechanical portion composed of the motor, the fan and the air filter, the inlet part of the casing, the outlet part of the casing, and the handle.

This permits of easy inspection of all parts of the device and, in the event of damage to certain parts, of easy access to them for repair or replacement.

The dust-laden air is drawn in at $F_1$ through an opening 14 and escapes from $F_2$ through a tube 16 after passing through the fixed air filter 15 and leaving its dust behind in the chamber 42 formed around the filter in the part 1 of the casing. Disposed in the wall of the chamber 42, in advance of the filter 15, is a door 13 swingable about a pivot 29 for discharging the dust which accumulates outside the filter 15 and inside the chamber 42. The inlet opening 14 is formed, as shown, in the door 13.

Opening of the door 13 is effected by simple finger pressure on a rocking presser member 17 pivoted at 18. A spring 19 taking against a rim 53 on the member 17 normally holds the latter in its raised position. Engaged over this rim 53 is a hook 20 formed at the end of a fastening member 21 in the form of a small plate mounted on a fixed pivot 22 and urged by a spring 23 in the direction $f$. Bearing against the lower part of the member 21 is the upper end of a second similar fastening member 26 which itself turns in the direction of the arrow $f_1$ about the pivot 22 under the action of a spring 23'. By pressing on the member 17, rotation of the member 21 about its pivot 22 is permitted. The fastening member 26 pivots in turn in the direction $f_1$. It terminates below in a nose 54 hooked over a lug 28 on the door 13. The door, under its own weight or the action of a spring, not shown, swings in the direction of the arrow $f_2$, which opens the aperture 52 and consequently allows the dust to flow out freely.

The drawing also shows a wavy spring 30 secured by a screw 55 to the door 13 and bearing by its undulations against a cam member 56 forming the end of a leaf spring 31 itself bearing against the lateral wall of the filter 15 and secured by a screw 74 to the casing part 1. Opening of the door 13 thus causes displacement of the wavy part 30 in contact with the cam 56 and consequently vibration of the filter cloth, which dislodges the dust.

The suction device illustrated is furnished with an arrangement for positioning the outlet tube 16, so that the directing of the discharged jet of dust-free air towards the operator or into the sleeve of his jacket can be avoided. For this purpose, the tube 16 has, as can be seen, a bent shape and consists of a part 32 forming an outlet nozzle and a part 32' which pivots in the interior of a sleeve 57, formed in the casing part 2, with the interposition of a seal 38 making a tight joint. A boss 75 is fixed at the centre of the tube 16 by a cross piece 77. Fitted in this cross piece is a rod 33 terminating at its upper part in a threaded portion 76 which secures the tube 16 to the casing part 2, while permitting it to turn, by a spring washer 34, a nut 36 screwed on the threaded portion 76 and a nut-locking member 37. The tube 16 bears by its collar 58 against a corresponding bearing surface formed on the one end 59 of the sleeve 58 of the casing part 2, while the spring washer 34 bears a corresponding bearing surface formed on the other end 35 of said sleeve. It is possible, by turning the short tube 16 about its pivot 33, to move this tube to any angular position between the position shown in full lines and that shown in chain lines in Figure 1. By screwing or unscrewing the nut 36, it is possible to adjust the friction of the washer 34 against the surface 35, that is to say to adjust the movements of the bent tube 16 in the sleeve 57.

Conveniently, the outlet nozzle 32 is internally conical and flared outwardly, in order that an auxiliary appliance such as a hair dryer, spray device or the like may be easily fitted therein. It is obvious that such auxiliary appliances can then be directed in any required direction without modifying the position of the suction device itself, by only rotating the fitting tube 16.

I claim:

1. In a suction device, in combination, front and rear hollow casing elements disposed in abutting connected relation, an opening in the outer end of said front casing element, a door hinged to said front casing element and closing said opening, an air inlet opening on said door, an air outlet opening on the rear casing element, a laterally extending inclined outlet nozzle mounted in said air outlet, a motor and fan assembly resiliently mounted in said casing between said air inlet and outlet openings, an inwardly extending hollow socket on said rear casing element in axial alignment with the motor and fan assembly for reception of a connection from an auxiliary appliance to be driven from said motor assembly, a closed air filter bag mounted on said motor and fan assembly adjacent the air inlet opening for removing any suspended dust from the air before passing to said fan, said door when opened providing a discharge opening for dust removed from the air by said filter bag, and means on said door cooperating with said air filter bag for vibration thereof to dislodge dust therefrom as the door is opened.

2. A dust suction device as defined in claim 1, wherein the motor and fan assembly resilient mounting comprises on the one hand a first and a second circumferential flange on a housing enclosing the motor and fan, an elastic annular member a part of which is clamped within said first and second flanges and another part of which is clamped between the two parts of the casing, the said annular member being positioned at the largest part of the motor and fan assembly and one end of the air filter bag being secured by a clamping ring to the motor fan housing in the vicinity of said annular member, and means for centering the outlet end of the motor and fan assembly with respect to said socket.

3. A dust suction device as defined in claim 2, wherein the means for centering the outlet end of the motor and fan assembly consists of an annular U-section channel co-axial with the casing, an elastic toric ring disposed in this channel, and an annular projecting part on the said assembly fitting into said ring.

4. In a suction device, in combination, front and rear hollow casing elements disposed in abutting connected relation, an opening in the outer end of said front casing element, a gravity opening door hinged to said front casing element and closing said opening, locking means for holding said door closed comprising a first plate pivotable in relation to the casing and having a lower edge which engages a co-acting edge of the door and having an upper edge, a second plate having an upper edge and a lower edge and being pivotal in relation to the casing about an axis adjacent to its lower edge with said lower edge bearing against the upper edge of the first plate, a presser member pivoted on the front end of the casing and having a recess engaged with the upper edge of the said second plate, a first spring acting against the presser member and tending to maintain the said recess and the said upper edge in engagement, and second and third springs tending to cause the first and second plates respectively to turn about their pivots outwardly from the inside, an air inlet opening on said door, an air outlet opening on the rear casing element, a motor and fan assembly resiliently mounted in said casing between said air inlet and outlet openings, a closed air filter bag mounted on said motor and fan assembly adjacent the air inlet opening for removing suspended dust from the air before passing to said fan, said door when opened providing a discharge opening for dust removed from the air by said filter bag, and means on said door cooperating with said air filter bag for vibration thereof to dislodge dust therefrom as the door is opened.

5. A dust suction device as defined in claim 4, wherein the shaking means fixed to the door and co-acting with the filter bag comprises a leaf spring secured to the casing with a bearing engagement against the lateral wall of the filter bag and having a cam member adjacent its free end, and a flexible wavy spring secured to the door and engaging with cam member.

6. A dust suction device as defined in claim 1, wherein the lateral inclinable outlet nozzle comprises a first portion obliquely directed with respect to the axis of the casing, a second portion whose axis is at an angle to the axis of the first portion, a sleeve formed in the casing, and means for rotatably mounting the first portion of the nozzle with an adjustable friction in the said sleeve.

7. A dust suction device as defined in claim 6, wherein the means for rotatably mounting the first portion of the nozzle comprises a collar on the nozzle, a first bearing surface on one end of the said sleeve for cooperating with said collar, a sealing gasket between said first portion and sleeve, a central boss in the said first portion, a cross-piece for carrying said boss from the wall of said first portion, a threaded means fitted in said boss, a nut screwed on said threaded means, and a spring member actuated by said nut and bearing against the end surface of said first portion and against a bearing surface formed on the other end of said sleeve.

8. In a suction device, in combination, a front casing part and a rear casing part, a resilient gasket disposed between adjacent ends of said parts, means connecting said adjacent casing ends and gasket into a unitary assembly, means integral with said rear casing part adjacent the longitudinal axis of the suction device providing a hollow enclosure extending inwardly from the exterior of one face of the casing part, an annular member secured to the inner end of said hollow enclosure, an annular resilient member mounted in said annular member concentric with said hollow enclosure, a motor having a shaft extending from one end thereof, a suction fan mounted on the motor shaft inwardly of the outer end thereof, said outer end of the motor shaft being disposed within said annular resilient member in axial alignment with said hollow enclosure, a motor and shaft support having an annular end portion engaged within said annular resilient member in concentric supporting relation to the adjacent end of the motor shaft, an annular resilient member within said casing and supported by the adjacent ends of said casing parts, said motor support being disposed within said latter annular resilient member and connected therewith providing a resilient support for the motor within the casing.

References Cited in the file of this patent

UNITED STATES PATENTS

| | | |
|---|---|---|
| 1,757,239 | Engberg et al. | May 6, 1930 |
| 2,226,630 | McCord | Dec. 31, 1940 |
| 2,574,412 | Pringle | Nov. 6, 1951 |
| 2,721,624 | Osborn | Oct. 25, 1955 |

FOREIGN PATENTS

| | | |
|---|---|---|
| 255,938 | Switzerland | Feb. 1, 1949 |